May 24, 1949.   J. R. HASSELL   2,471,371
AUTOMATIC WATER TEMPERATURE CONTROL
Filed April 9, 1947   2 Sheets-Sheet 1

Inventor
James Randolph Hassell

By Clarence A. O'Brien
and Harvey B. Jacobson
Attorneys

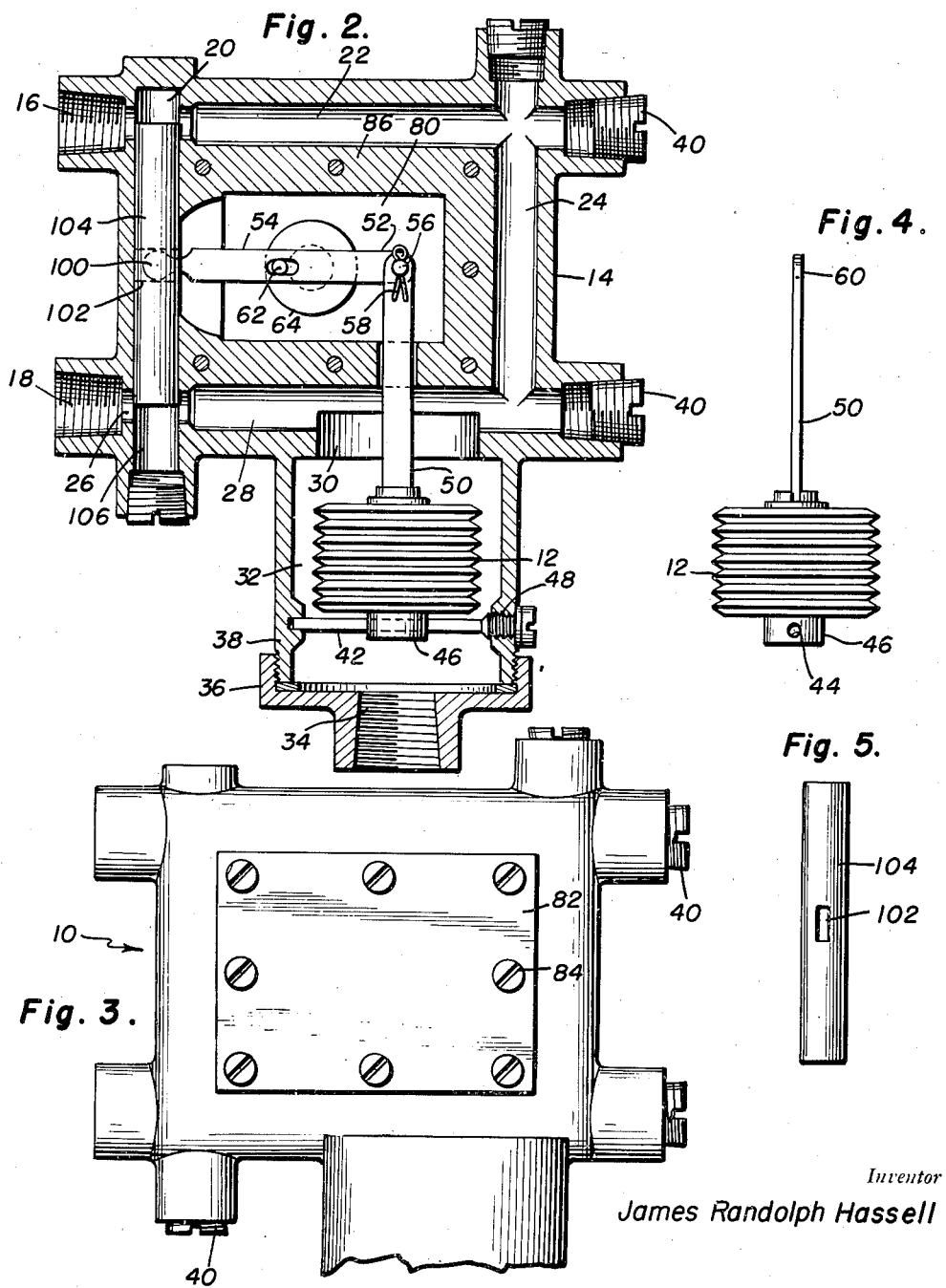

Patented May 24, 1949

2,471,371

UNITED STATES PATENT OFFICE 2,471,371

AUTOMATIC WATER TEMPERATURE CONTROL

James Randolph Hassell, South Dos Palos, Calif.

Application April 9, 1947, Serial No. 740,285

2 Claims. (Cl. 236—12)

This invention relates generally to automatic water temperature controls, commonly referred to as mixing valves, and more particularly to certain improvements and refinements in mixing valves adapted for easy manual adjustment and for use in connection with a faucet or other flow controlling device.

An object of this invention is to provide a device which when used in connection with a faucet and sources of hot and cold water will accurately control the temperature of the water flowing from said faucet.

Another object of this invention is to provide a mixing valve of simplified mechanical construction and adapted to render trouble-free service, the device being made rugged without sacrificing sensitivity.

Another object of this invention is to provide a water mixing valve in which the control lever may be mounted on either side of the device, thereby simplifying the installation thereof and increasing the versatility of the valve.

And the last object to be specifically mentioned is to provide a mixing valve which will be inexpensive and practicable to manufacture, simple and convenient to use, and which will give generally efficient and durable service.

With these objects, and other objects which will appear as this description proceeds, definitely in view, this invention resides in certain novel features of construction, combination and arrangement of parts and portions as will be hereinafter described in detail and particularly set forth in the appended claims, reference being had to the accompanying drawings forming a material part of this application, and in which:

Figure 2 is a vertical sectional view of the assembled device, the view being taken substantially along the center line of Figure 1;

Figure 3 is a fragmentary elevational view of the upper portion of the structure shown in Figure 2, the view being taken from the side remote from the control lever;

Figure 4 is an elevational view of the thermostat unit;

Figure 5 is an elevational view of the valve plunger;

Similar characters of reference indicate similar or identical parts and portions throughout the specification and throughout the several views of the drawings.

Figure 1:
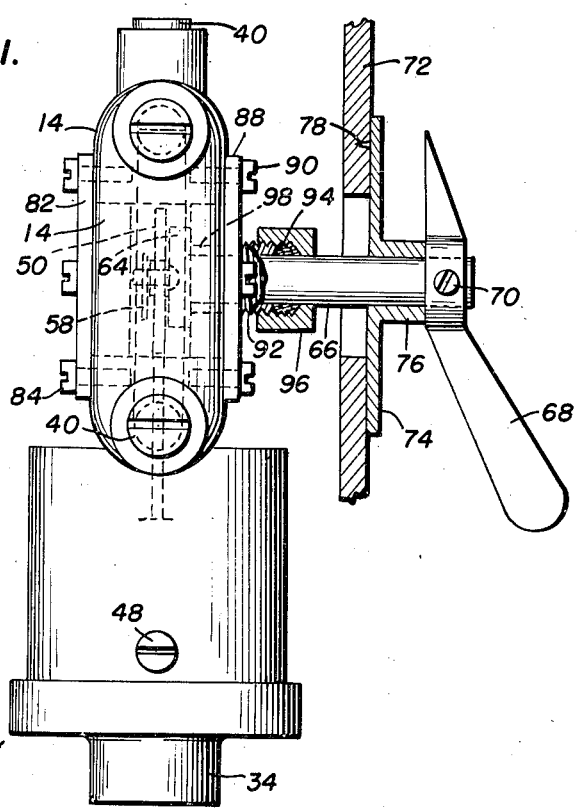
Figure 1 is a side elevational view of the assembled valve, with a number of the interior portions thereof shown in dash lines and the gland nut of the lever control shaft shown in section, to facilitate the illustration.

Referring now to the drawings which illustrate one preferred embodiment of this invention, the molded casing generally indicated by the numeral 10 is comprised of two main portions, one portion being generally cylindrical to house the thermostatic unit 12 and a generally ractangular portion 14. This rectangular portion is provided with an inlet 16 for cold water and an inlet 18 for hot water, as best shown in Figure 2. The cold water inlet communicates with a channel 20 and 22 and with a transverse channel 24, while the hot water inlet communicates with the channel 26 and 28, there being a common outlet provided at 30 communicating with the chamber 32 for the thermostat unit 12, and the threaded outlet for the mixed water is shown at 34, this outlet being threaded in order to facilitate the attachment thereto of a faucet or other control device. The method of providing the above mentioned channels is a matter of mechanical expediency, but it is preferred that the last mentioned outlet 34 should be provided by an apertured interiorly threaded cap 36 adapted to be screwed on to the correspondingly threaded lower end of the thermostat chamber indicated at 38, while the other above mentioned channels may be drilled and stopped by plugs 40, as indicated in Figure 2.

The thermostat unit 12 is mounted by means of a securing pin 42, inserted through a drilled aperture 44 in the terminal boss 46 of the thermostat, the end of the securing pin 42 being enlarged and threaded as at 48 for removable securement to the casing. On the upper end of the thermostat unit 12 a rigid strap member 50 communicates the movement of the upper portion of the thermostat to the end 52 of a lever 54, being secured thereto by a pin 56 and a cotter pin 58, the upper ends of the strap member 50 being apertured as at 60 and the end 52 of the lever 54 being similarly apertured to allow the insertion of the pin 56.

Figure 6:
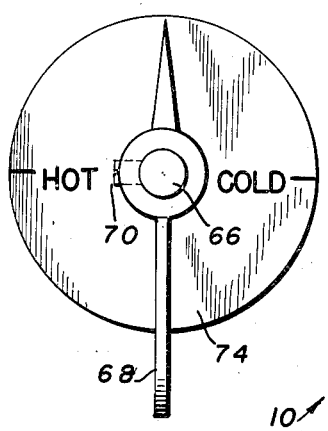
Figure 6 is an elevational view of the control lever and a dial plate securable to a wall, as indicated in Figure 1.
Figure 8:
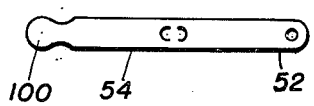
Figure 8 is a view of the lever used to actuate the plunger.
Figure 7:
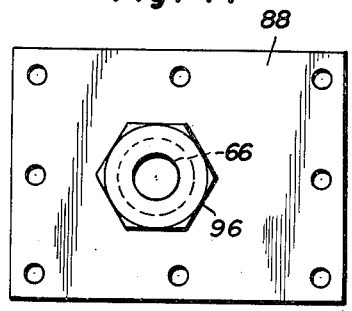
Figure 7 is an elevational view of the side plate with the gland nut for the shaft of the control lever.
Figure 9:
Figure 9 is a side view of the shaft or the control lever and the eccentric mounting means for the lever as shown in Figure 8.
Figure 10:
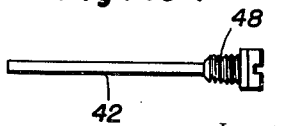
Figure 10 is a view of the threaded securing pin for the thermostat unit.

The lever 54 is pivotally mounted on the pin 62 fixed in the disc 64, which disc is carried on the end of the shaft 66 and this shaft 66 is the control shaft for regulating the mixing valve, being provided at the outer end thereof with a pointed lever handle 68, secured by a set screw 70, all as best illustrated in Figures 9 and 1. In this connection it may be noted that the mixing valve may be used either exposed or recessed in a wall, indicated at 72 with an extending portion of the shaft 66 disposed outside the wall and associated with a dial plate 74, as illustrated in Figures 1 and 6, which is provided with a bearing 76 and any suitable means such as the tooth 78 to prevent the plate from turning with the shaft.

The mechanism associated with the lever 54 is housed within a relatively large recess 80 centrally and transversely disposed in the casing and adapted to be closed on one side by the flat generally rectangular plate 82, secured by stud bolts 84 inserted into apertures drilled and tapped into the wall 86 enclosing the aperture 80, while the other side of this aperture is closed by a somewhat similar plate 88, similarly secured in place by threaded studs 90. The plate 88 is provided with an exteriorly threaded boss 92 and this boss and the plate 88 are drilled to receive the shaft 66, the outer ends of the boss being concaved to receive the packing 94, which packing is retained in position by the gland nut 96. A sleeve 98, shown in dotted lines in Figure 1, is inserted between the inner side of the plate 88 and the eccentric disc 64 to properly space the latter with relation to the lever 54.

From the foregoing it will be evident that the vertical movement of the thermostat unit will cause the lever 54 to pivot on the pin 62. The end 100 of the lever 54 may be ball-shaped or otherwise formed to minimize friction thereof within a slot 102 centrally disposed in the valve plunger 104 which is moved longitudinally by the lever 54 within a carefully finished channel 106 disposed transversely of both inlets 16 and 18, the ends of the plunger 104 being carefully formed to register with and to selectively close the inlets when moved longitudinally by the lever 54, the intermediate positions of the plunger resulting in both inlets being partially open.

The method of operation of this invention will be reasonably obvious from the foregoing description of the mechanical details but, in recapitulation, it may be noted that the inlet 16 will normally be used for cold water, while the inlet 18 will be used for hot water, the passage of the two streams of water being controlled by the positioning of the plunger 104, the tempered water being emitted from the device through the outlet 34. For any given setting of the handle 68 the subsequent regulation of the temperature of the outlet water is automatically controlled by the thermostatic unit 12 operating the lever 54 on its pivot point 62 to control the plunger 104, the expansion of the thermostatic unit, reflecting too high a temperature, causing the lever to be moved so that the cold water inlet 16 is opened slightly and the hot water inlet 18 is simultaneously closed to a similar degree. Finally, the manipulation of the lever 68 will cause the eccentric 64 to shift the pivot point 62 of the lever 54 and thereby shift the initial or normal position of the plunger 104 for any given position of the thermostatic unit, thereby enabling regulation of the device to provide water at the outlet 34 at any predetermined temperature, contingent of course upon the adequacy of the supply of cold and hot water.

Obviously, minor alterations may be made in the method of construction of the casing 10 and the details of construction of the various elements in this invention and though there has been shown a particular embodiment of this invention, this application does not limit the invention to this particular embodiment, but it is desired to include in the scope of this invention the construction, combination and arrangement of parts and portions substantially as set forth in the appended claims.

What is claimed as new and desired to be secured by Letters Patent is:

1. An automatic water mixing valve including a casing having a base, spaced hot and cold water inlets, a valve plunger slidably mounted in said casing with the ends thereof adapted to simultaneously and oppositely vary the opening of said inlets, a common outlet communicating with said inlets, and a thermostat in said outlet operatively connected with said valve plunger by a lever pivotally connected to said thermostat and to said plunger, said lever having an aperture intermediate its ends, and a shaft extending through a watertight connection to the exterior of said casing, said shaft having a pivot pin eccentrically disposed on its inner end and receivable in said aperture, whereby said lever may be shifted to vary the position of the plunger.

2. An automatic water mixing valve according to claim 1 and wherein said casing has opposed side openings, interchangeable cover plates for these openings, said shaft and water-tight connection being carried by one of said plates to allow a single valve casing to have temperature adjusting means mounted on either side thereof.

JAMES RANDOLPH HASSELL.

REFERENCES CITED

The following references are of record in the file of this patent:

UNITED STATES PATENTS

| Number | Name | Date |
|---|---|---|
| 1,137,921 | Snediker | May 4, 1915 |
| 1,715,662 | Laskey | June 4, 1929 |
| 1,954,903 | Walker | Apr. 17, 1934 |
| 2,349,051 | Novak | May 16, 1944 |